Nov. 23, 1965     M. WALLSHEIN     3,218,715
ORTHODONTIC FITTINGS
Filed March 21, 1962
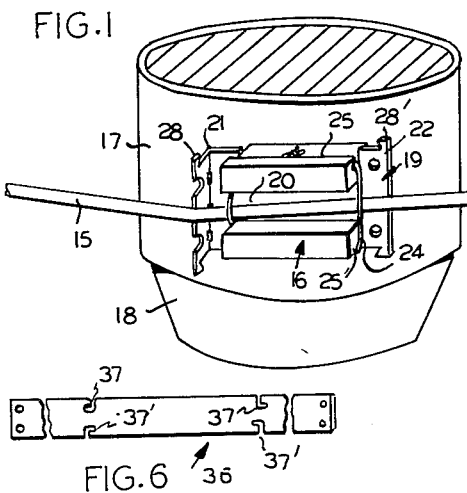
FIG.1
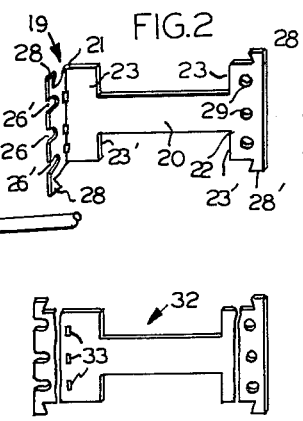
FIG.2
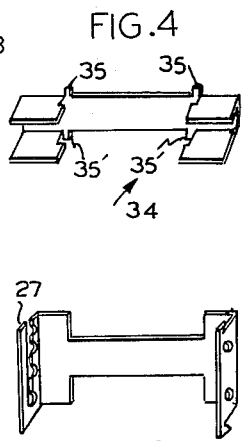
FIG.4
FIG.3     FIG.5
FIG.6
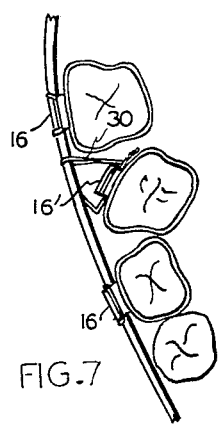
FIG.7
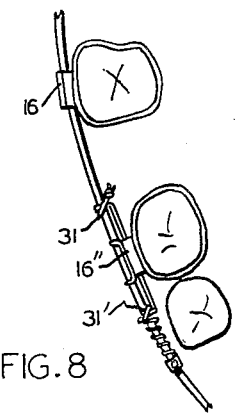
FIG.8
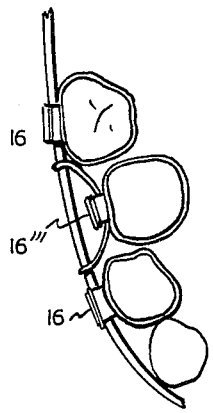
FIG.9
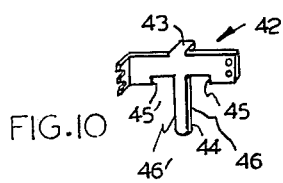
FIG.10
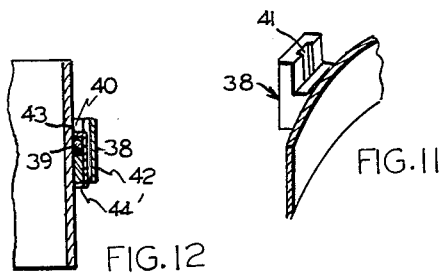
FIG.12     FIG.11
INVENTOR,
MELVIN WALLSHEIN,
BY
ATTORNEY

United States Patent Office 3,218,715
Patented Nov. 23, 1965

3,218,715
ORTHODONTIC FITTINGS
Melvin Wallshein, 8645 Bay Parkway, Brooklyn, N.Y.
Filed Mar. 21, 1962, Ser. No. 181,321
8 Claims. (Cl. 32—14)

The present invention relates to orthodontic fittings for turning, restraining from turning and for otherwise shifting and restraining a tooth in a mouth already equipped with an arch wire mounted on brackets.

An object of this invention is to provide novel and improved orthodontic fittings for association with a bracket carried on a tooth, to co-operate with the arch wire to effect alignment of such tooth, either by causing said tooth to turn in a certain direction, move in a predetermined straight direction or to hold the tooth against movement in one direction while other forces move said tooth in another direction.

Another object thereof is to provide a novel and improved orthodontic fitting of the character mentioned, which will convert a short channel bracket in the mouth to a long channel bracket, thereby avoiding the necessity to undo established orthodontic installations.

A further object of this invention is to provide an orthodontic fitting for the purposes mentioned, which automatically engages itself with the bracket it is associated with and is thus held against movement along the arch wire whereby the action of such fitting is localized and its slippage from a set position, avoided.

Still another object thereof is to provide novel and improved orthodontic fittings of the nature set forth, having the mentioned attributes and which are simple in construction, cheap to manufacture, easy to manipulate to be adaptable for various situations in orthodontic procedures and efficient in carrying out the purposes for which they are designed.

Other objects and advantages will become apparent as this disclosure proceeds.

For the practice of this invention, one form it may assume is to have a piece of flat strip material blanked so its mid-section is of a width which is narrower than its end sections and of a length which is that of the bracket's channel it is to fit into. The cut-outs in the strip being along both longitudinal edges, provide shoulders which abut the side edges of the bracket's channel and hold the fitting against movement along the arch wire when such mid-section of the fitting is set into the bracket. The end sections are made of such lengths to suit the particular use the fitting is to perform and they are bendable into various shaped forms as may be required to coact with the arch wire in various ways. Said end sections of the fitting have notches, holes, cut-outs, tabs, fingers and other formations to suit particular conditions and for the most uses thereof, said strip is springy, though in some instances it is of non-resilient material.

As a modified embodiment, the strip may be of uniform width with various notches or other cut-outs to receive tie wires to position such fitting in the bracket. To serve as a fitting for offering a longer channel than that of the bracket, the strip is made with channel form with lugs or bends or other means to hold it in the bracket against movement along the arch wire.

I will now set forth several specific forms of construction of fittings embodying teachings of this invention and will also indicate some practical applications therefor in orthodontics, for which I will refer to the accompanying drawing which is part of this specification; similar characters of reference in said drawing, indicating corresponding parts in all the views.

FIG. 1 is a perspective view of a tooth in a mouth equipped with an arch wire which is supported in the channel of a bracket mounted on such tooth and there is a fitting which embodies teachings of this invention, associated with such bracket and arch wire.

FIG. 2 is a perspective view of such fitting.

FIG. 3 shows the blank of said fitting.

FIGS. 4–6 are perspective views of fittings of modified constructions respectively, but each in accordance with teachings of this invention.

FIG. 7 is a fragmentary top plan view of the lower teeth in a mouth equipped with an arch wire which is supported by brackets mounted on various of the teeth, and includes a fitting embodying teachings of this invention heretofore mentioned, arranged to cause one of the teeth to be turned towards proper alignment.

FIG. 8 is a similar view, showing the use of a fitting as taught herein, adapted in an installation arranged to move one tooth towards another; the said fitting acting to maintain such tooth to be moved, from turning.

FIG. 9 is another similar view showing a fitting of this invention, arranged to move a tooth towards the arch wire.

FIG. 10 is a perspective view of another fitting of modified construction, embodying this invention and suited for use in a bracket having a channel for the arch wire and another channel which this time is height-wise, to receive a key piece.

FIG. 11 is a fragmentary perspective view of the bracket spoken of in the description of FIG. 10.

FIG. 12 is a section showing the fitting of FIG. 10 associated with the arch wire and with the bracket of FIG. 11.

All the views are drawn enlarged.

In the drawing, the numeral 15 designates an arch wire installed about the upper teeth in a mouth where it is supported on brackets, as for instance, the one shown at 16 which is a horizontal channel form carried on a thin band 17; such band being tightly fitted on a tooth 18. An orthodontic fitting, designated generally by the numeral 19, is made of springy strip material and consists of a comparatively narrow intermediate section 20 and the wider end sections 21 and 22 whereby the shoulders 23, 23' are formed. Said intermediate section is dimensioned to fit in and along the channel bracket 16 and of course, said shoulders maintain the fitting 19 against movement along the arch wire 15. A tie wire 24 in front of the arch wire and engaging the lateral flanges 25, 25' of the bracket maintains the assembly and holds the fitting 19 from coming out of the bracket. For said fitting to engage the arch wire, it may have notches as 26, 26' with or without spring fingers as for instance shown at 27 on the fitting's end sections and such outer sections may have undercut extending tabs as 28, 28' and holes as at 29 to accommodate tie wires as shown at 30, 31, 31' for association with the arch wire. The end sections of the fitting may be of any lengths along the arch wire and the fitting may be sold in flat blanks for the orthodontist to bend and fashion into any form he may need: such flat stock form being shown at 32 which may even have perforations 33 to offer weakened lines along which the bends are to be made, if bends are necessary. The fitting may also be principally of channel form as at 34, offering tabs 35, 35' to determine the intermediate section to fit in the channel bracket. Then again, the fitting may be a flat strip 36, whose end sections may be bent as intended function will require, and notches 37, 37' are provided to define the intermediate section.

In FIG. 1, the action of the tightened arch wire 15 against the forward edge of the end section 21 of the fitting 19 which is of non-resilient material, will tend to cause the tooth 18 to turn slightly clockwise. In FIG. 7, the fitting 19' is mounted in the bracket 16', but here, it is of resilient material and section 21 is stress-bent to an acute angle and pressing against the arch wire 15' while the section 23 is tied to the arch wire by a tie wire 30. By this arrangement, the tooth 18' concerned, will be acted upon by the force created by the fitting 19' whereby said tooth will be turned in a counter-clockwise direction since the length of the tie 30 remains unchanged. In FIG. 8, the end sections of the fitting 19" are both bent, for the fitting to be of U-form. The mid-section of said fitting is held in the bracket 16", on the tooth 18" which is to be moved towards the tooth 38, without being turned. Ordinarily heretofore, a compression coil spring about and anchored to the arch wire, would be arranged to press on the bracket end of the bracket on the tooth to be shifted. This however, occasioned an incidental turning action on the tooth. Now, by the use of a fitting 19" in the set up shown in FIG. 8, the end sections thereof bear against the arch wire 15" and are there tied to such arch by the tie wires 31, 31' and the coil spring 39 anchored to said arch wire at 39', is set stressed in compression against the fitting 19" which is of non-resilient material. Since the bracket 16" is kept from turning by this arrangement, the spring's action will only shift the tooth 18" towards the tooth 38 in a straight direction. In FIG. 9, it is evident that the tooth 18'" is to be moved towards the arch wire 15'". Here the fitting 19'" is resilient, stressed in a bow with the distal side ends of its end sections bearing against the arch wire 15'" and tied by tie wires 41, 42. Upon the action of said bow form to straighten, and the ends of the fitting being held fast, it is evident that the tooth 18'" will be shifted towards the arch wire 15'". When the end sections of the fitting 32 are bent to channel form as in the fitting 34 and stop tabs 35, 35' provided, such fitting 34 can be placed in any bracket of channel form, to lengthen it. Heretofore, the band with short channel bracket had to be removed from the tooth and an assembly having a longer channel bracket remounted on the tooth.

For a bracket as 38 which supports an arch wire 39 in the channel formed at 40 and provided with a heightwise channel 41 for a key piece, the fitting in the form of 42 is used, so as to have the upper medial tab 43, and the key piece 44 extending downward from the fitting's body. Here the locating shoulders may be as indicated at 45, 45', or the edges 46, 46' of the key piece, may serve as the locating shoulders for the fitting 42.

Having the fittings herein taught with the shoulders as set forth, provides means for automatically maintaining each fitting against movement along the arch wire, once set into the channel of a bracket, or the special channel 41 for the shoulders 46, 46' of the fitting 42. Instead of such provisions, the fitting may be as 36, where slots 37, 37' are provided for having such fitting tied to the bracket by tie wires (not shown), which is readily understood by those versed in this art, without the necessity of further illustration.

It is to be noted that any of the fittings shown herein may have its components bent into many forms as the orthodontist will devise to accommodate the function it is to perform; the manners specifically described herein being mere examples to show its versatility.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description and showings herein to indicate the scope of this invention.

I claim:
1. In an orthodontic system comprising in combination, an element to be mounted on a tooth, an arch wire bracket having a horizontal channel therein secured to said element, an elongated strip whose intermediate section is narrower than its end sections whereby each end section provides a shoulder at an end of said intermediate section; said intermediate section being within and along said channel and said end sections being out of the ends of said channel; said shoulders acting as stops against said bracket, maintaining said strip against longitudinal movement, means on said bracket holding said strip against lateral movement out of said channel, an arch wire in said channel and means contacting at least one of said end sections with the arch wire whereby corrective forces may be applied to a tooth on which the system may be applied.

2. The orthodontic system as defined in claim 1, wherein each end section extends beyond both longitudinal edges of the intermediate section which are along the channel whereby each of said end section provides a shoulder at each of said edges respectively.

3. The orthodontic system as defined in claim 1, wherein the shoulders are formed by a tie wire held on the bracket; said strip having notches at each end of the intermediate section, said tie wire being in engagement with said notches.

4. The orthodontic system as defined in claim 1, wherein near an end edge of the strip, at least one of the end sections is provided with a relatively deep notch in a plane substantially normal to said strip whereby a finger is formed extending along said end edge of the strip, on said end section.

5. The orthodontic system as defined in claim 1, wherein at least part of at least one of the end sections of said strip includes a horizontal channel form for holding the arch wire.

6. The orthodontic system as defined in claim 1, wherein at least one of the end sections of the strip is provided with at least one opening therein for attachment of a tie wire.

7. The orthodontic system as defined in claim 4, wherein the end section having said finger is provided with at least one notch opposite said finger so that when the arch wire is forced into said notch to lie therethrough, the finger will keep said wire in said notch; said strip being of flexible material.

8. The orthodontic system as defined in claim 1, wherein at least one of the end sections of said strip has a weakened section to facilitate the bending of such end section.

References Cited by the Examiner
UNITED STATES PATENTS

| | | | |
|---|---|---|---|
| 1,764,067 | 6/1930 | Craigo | 32—14 |
| 2,686,365 | 8/1954 | Schurter | 32—14 |
| 2,716,283 | 8/1955 | Atkinson | 32—14 |
| 3,085,336 | 4/1963 | Kesling | 32—14 |
| 3,128,553 | 4/1964 | Begg | 32—14 |

RICHARD A. GAUDET, *Primary Examiner.*

ROBERT E. MORGAN, *Examiner.*